United States Patent [19]
Kim

[11] Patent Number: 5,920,180
[45] Date of Patent: Jul. 6, 1999

[54] BATTERY CHARGER FOR PREVENTING MEMORY EFFECT

[75] Inventor: Dong-Ho Kim, Suwon, Rep. of Korea

[73] Assignee: SamSung Electronics Co., Ltd., Suwon, Rep. of Korea

[21] Appl. No.: 08/885,737

[22] Filed: Jun. 30, 1997

[30] Foreign Application Priority Data

Jun. 29, 1996 [KR] Rep. of Korea ............ 96-26434

[51] Int. Cl.⁶ .................................................. H01M 10/46
[52] U.S. Cl. ................................. 320/128; 320/162
[58] Field of Search ................................ 320/125, 128, 320/132, 134, 136, 156, 157, 162, FOR 120, FOR 129, FOR 131, FOR 138, DIG. 16

[56] References Cited

U.S. PATENT DOCUMENTS

| | | |
|---|---|---|
| 4,302,714 | 11/1981 | Yefsky . |
| 4,323,788 | 4/1982 | Smith . |
| 4,849,681 | 7/1989 | Schmidt et al. . |
| 4,876,495 | 10/1989 | Palanisamy et al. . |
| 5,182,509 | 1/1993 | Simmonds . |
| 5,225,762 | 7/1993 | Langford . |
| 5,233,284 | 8/1993 | Mattson . |
| 5,280,230 | 1/1994 | Mahoney . |
| 5,304,915 | 4/1994 | Snapei et al. . |
| 5,475,294 | 12/1995 | Isoda . |
| 5,508,598 | 4/1996 | AlAbassy . |
| 5,523,667 | 6/1996 | Feldstein . |
| 5,576,608 | 11/1996 | Nagai et al. . |
| 5,621,297 | 4/1997 | Feldstein . |
| 5,629,600 | 5/1997 | Hara . |
| 5,637,981 | 6/1997 | Nagai et al. . |

*Primary Examiner*—Edward H. Tso
*Attorney, Agent, or Firm*—Robert E. Bushnell, Esq.

[57] ABSTRACT

A battery charger, for preventing deterioration from the memory effect, that includes a switching circuit with first and second reference voltages. The second reference voltage is lower than the first reference voltage. The switching circuit forcibly discharges a battery where the voltage level corresponding to battery capacity is between the first and second reference voltages, and charges the battery after the battery capacity reaches the second reference voltage.

16 Claims, 2 Drawing Sheets

BATTERY CHARGER FOR PREVENTING MEMORY EFFECT

CLAIM FOR PRIORITY

This application makes reference to, incorporates the same herein, and claims all benefits accruing under 35 U.S.C. §119 from applications for BATTERY CHARGER FOR PREVENTING MEMORY EFFECT earlier filed in the Korean Industrial Property Office on the 29 day of June 1996, and there duly assigned Ser. Nos. 1996/26434, a copy of which is annexed hereto.

BACKGROUND OF THE INVENTION

This invention relates to a processes and circuits for charging batteries and, more particularly, to processes and circuits providing increased lifetime of rechargeable batteries by minimizing diminution in charging capacity resulting from the memory effect.

DECEPTION OF THE RELATED ART

Devices such as a mobile telephone, cordless telephone, and pager usually use rechargeable batteries as a source of electric power. Since the utility of the products depends on the durations when talk and standby modes can be operated the longer the time between re-charging their batteries, the better their quality is. The memory effect is one factor reducing rechargeable battery duration. For example a rechargeable battery which is not completely discharged before being recharged memorizes the difference between charge voltage and discharge voltage, and a chemical reaction takes place to limit the capacity. Thus, the battery has a capacity below its original one. This phenomenon is called the memory effect.

Decrease in the capacity of rechargeable batteries can also be due to other causes such as overcharging, over-discharging, and an increase in the number of charge cycles. In conventional battery charger design, once a rechargeable battery to be charged is put into the battery charger, a constant current from constant current power supply is applied to the rechargeable battery and, because the battery is not completely discharged, the residual voltage across the battery is applied to turn on a light to signal the user that the battery is charging. When the user determines that a complete discharge of the battery is needed, the user closes a switch to short the battery to a local ground potential, thereby completely discharging the battery. This complete discharge prevents the memory effect so that the capacity of the battery can be increased. Then, when the user opens the switch after completion of the discharge, the constant current is applied to the rechargeable battery and charging begins. To prevent capacity reductions caused by the memory effect on the rechargeable battery, complete charging and discharging must occur. In contemporary practice the user must manually close or open the switch after determining the discharging point and the period of time for completion of discharge. Consequently, over-discharge can occur and cause a decrease in electric stability. I have noticed that the fact that the user must manually operate the discharge switch to perform discharging and charging operations is not only inconvenient, but a source of error in accurately recharging batteries that can ultimately reduce the capacity of the batteries.

It is therefore, an object of the present invention to provide an improved battery charging process and circuit.

It is another object to provide battery charging processes and circuits able to enhance the lifetime of rechargeable batteries by minimizing diminution in charging capacity of the batteries resulting from the memory effect.

It is still another object to provide a battery charging circuit and process for minimizing occurrence of the memory effect by checking and comparing battery voltage to a predetermined reference voltage, so as to prevent over-discharging.

It is yet another object to provide a battery charging circuit and process able to check and compare the voltage of a battery against a predetermined reference voltage, so as to prevent excessive discharging.

It is still yet another object to provide a battery charging circuit and process endeavoring to minimize occurrence of excessive discharge by checking and comparing the voltage of the battery being charged with a reference voltage.

It is a further object to provide a battery charging circuit and process that checks and compares the voltage of a battery against a reference voltage and automatically switches from a discharging operation to a charging operation.

To achieve these and other objects, a process and battery charger may be constructed to prevent occurrence of a memory effect, by using a switching circuit having first and second reference voltages, with the second reference voltage being lower than the first reference voltage. The switching circuit automatically discharges the battery when the amplitude of the voltage across the battery is between the first and second reference voltages, and charges the battery after the amplitude of the voltage across the battery reaches the second reference voltage.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENTS

Figure 1:
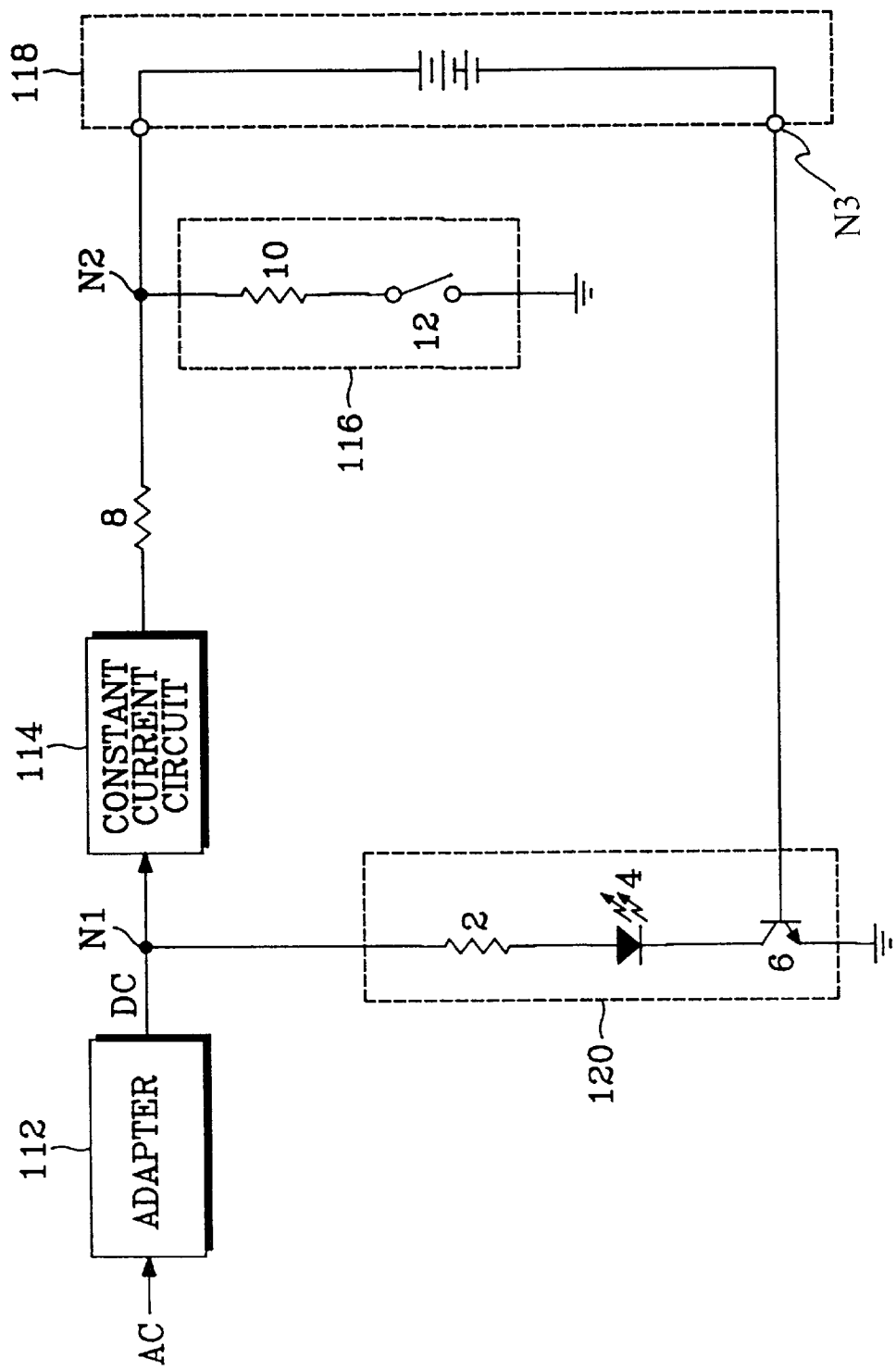
FIG. 1 is a circuit diagram representing the salient features of a hypothetical conventional battery charger.

FIG. 1 is a circuit diagram representing the salient features of a hypothetical conventional battery charger. Adapter 112 supplies electric power by converting alternating current (AC) to direct current (DC) at node N1. Constant current power supply 114 is connected to node N1 to receive the direct current and provide a constant current for performing constant current charging operations. Rechargeable battery 118 has been electrically disconnected from a portable electric appliance, removed from that appliance, and connected across nodes N2, N3. Complete discharge induction circuit 116, which is connected to a node N2 between constant current power supply 114 and rechargeable battery 118, is composed of resistor 10 and switch 12 connected in series between node N2 and a local reference potential such as a circuit ground. Charge display 120, is connected between node N1 and node N3 (n. b., N3 is the negative pole of rechargeable battery 118), consists of resistor 2, light-emitting diode (LED) 4, and transistor 6 all connected in series.

Once a rechargeable battery 118 has been coupled across node N2, N3 of the battery charger, a constant current from constant current power supply 114 is applied to rechargeable battery 118. When rechargeable battery 118 is coupled across nodes N2, N3, voltage is supplied to the base electrode of transistor 6 because battery 118 is not completely discharged and contains a residual voltage. Consequently, transistor 6 and LED 4 are turned on. The light emitted by LED 4 enables a user to recognize that battery 118 is being charged.

The user closes switch 12 when the user determines that a complete discharge is needed, thereby completely discharging rechargeable battery 118 through node N2. This complete discharge prevents occurrence of the memory effect, so that the capacity of the battery can be increased. When the user opens switch 12 after completing the discharge of battery 118, the constant current of constant current power supply 114 is applied to rechargeable battery 118 through charging resistor 8, and the charging of battery 118 begins.

To prevent reduction of the capacity of battery 118 caused by the memory effect on rechargeable battery 118, complete charging and discharging must occur. In contemporary practice, it is customary to forcibly discharge battery 118 via mechanical switch 12. The user must manually close or open the switch after determining a point of discharge and the period of time for the discharge. Therefore, excessive discharge can occur, with a concomitant decrease of electric stability. There is also the disadvantage that the user must manually turn discharge switch 12 on and off in order to perform these discharging and charging operations.

Figure 2:
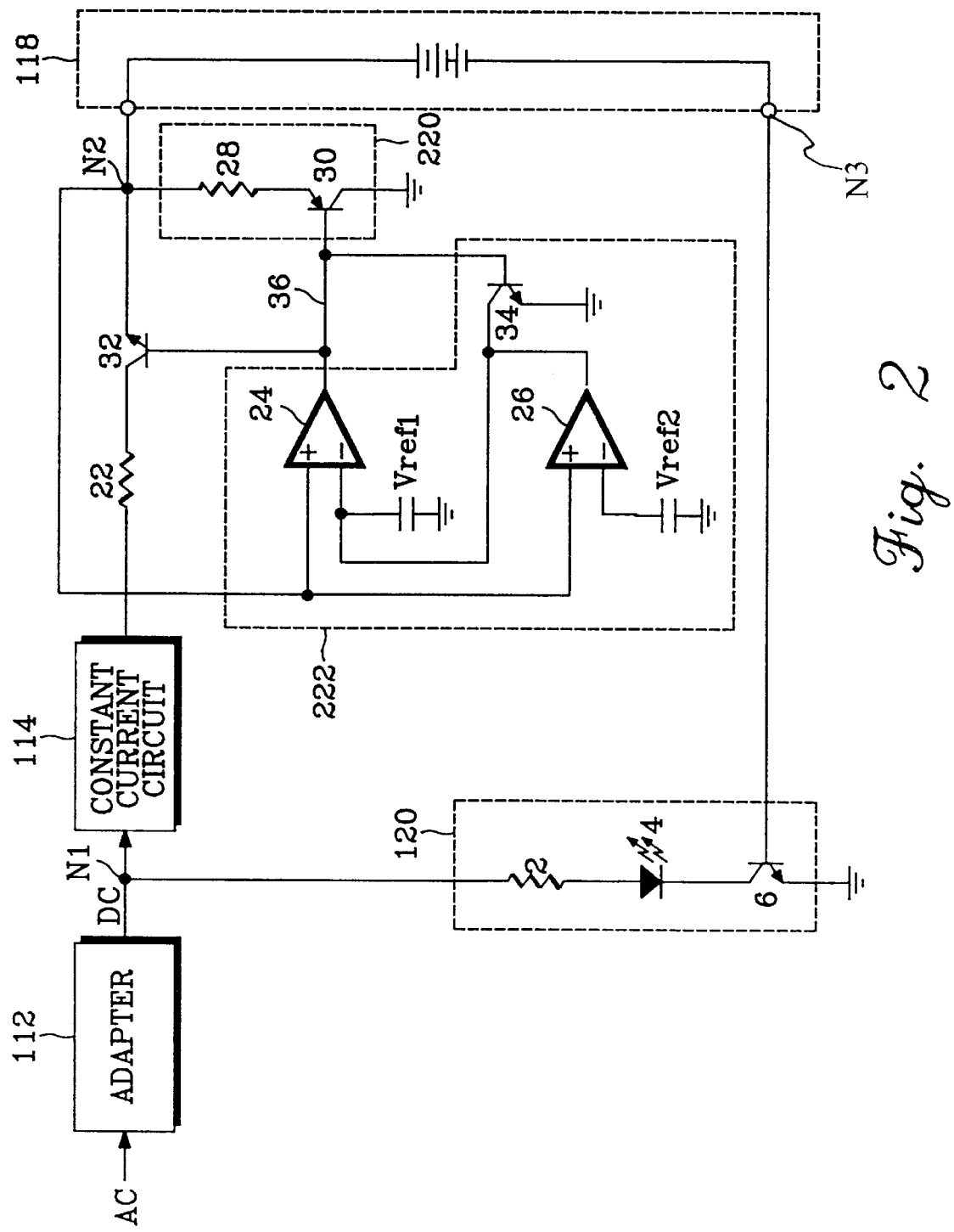
FIG. 2 is a circuit diagram of the battery charger constructed as a preferred embodiment of the present invention.

Turning now to FIG. 2, a preferred embodiment of the present invention is described below in detail. Adapter 112 converts alternating current into direct current, and applies the direct current to node N1. Constant current power supply 114 has an input port connected to node N1, and uses the direct current to produce a constant current that is applied to resistor 22. First switch 32, which is implemented with an NPN bipolar transistor having a base electrode coupled to lead 36 and a collector electrode coupled to the output port of constant current circuit 114 via resistor 22, is placed in an electrically closed (i.e., with the collector-emitter channel of transistor 32 in an electrically conducting state) state by a charge switching signal of "HIGH" voltage transmitted through lead 36, and is turned off (i.e., with the collector-emitter channel of transistor 32 in an electrically nonconducting state) by a discharge switching signal of "LOW" voltage applied to the base electrode of transistor 32 through lead 36, so as to respectively electrically complete or electrically break a charging circuit between constant current power supply 114 and battery 118. NPN transistor 32 conducts constant current electrical power to output node N2 and to the positive terminal of battery 118.

Complete discharge induction circuit 220 may be constructed with resistor 28, for regulating discharge, coupled in series between node N2 and the emitter electrode of PNP transistor 30. The emitter-collector channel of transistor 30 is coupled between resistor 30 and a local reference potential, such as a circuit ground potential. The base electrode of transistor 30 is coupled to lead 36. Consequently, PNP transistor 30 is turned off (i.e., with the collector-emitter channel of transistor 30 in an electrically non-conducting state) when the voltage on lead 36 is the "HIGH" charge switching signal, and turned on (i.e., with the collector-emitter channel of transistor 30 in an electrically conducting state) when the voltage is the "LOW" discharge switching signal. Complete discharge induction circuit 220 produces a complete discharge of the voltage held by battery 118 between its positive terminal coupled to node N2 and its negative terminal coupled to node N3.

Over-discharge protector 222 may be constructed with first and second comparators 24, 26, and NPN transistor 34. The positive input port of first comparator 24 and the positive input port of second comparator 26 are connected to output node N2. The negative input port of first comparator 24 terminal is connected to the first reference voltage, Vref1. The negative input port of second comparator 26 is connected to a second reference voltage, Vref2. When the voltage level at the positive input port of comparator 24 is higher than Vref1 applied to its negative input port, first comparator 24 generates the "HIGH" charge switching signal. When the voltage level of its positive input port is lower than Vref1 applied to its negative input port, first comparator 24 generates the "LOW" discharge switching signal.

Second comparator 26 generates an inactive second comparative signal of a "HIGH" voltage where the voltage at its positive input port is higher than the reference voltage Vref2 applied to its negative input port. Second comparator 26 generates an active second comparative signal of "LOW" voltage where the voltage at its positive input port is lower than reference voltage Vref2 applied to its negative input port.

NPN transistor 34 is turned on by the "HIGH" charging switching signal applied by lead 36 to the base electrode of transistor 34. When NPN transistor 34 is turned on, an electrically conducting circuit path is completed through the principal semiconducting channel of transistor 34 between its collector and emitter electrodes; thus the first reference voltage, Vref1, is shorted to the circuit ground potential through this conducting circuit path. Consequently, the negative terminal of first comparator 24 goes to ground potential and the output voltage at the output port of comparator 24 is the "HIGH" voltage. Whenever NPN transistor 34 is turned on to provide an electrically conducting path through the semiconducting channel between its collector and emitter electrodes, first comparator 24 generates a "HIGH" voltage at its output port.

The first reference voltage, Vref1, is the highest voltage of the complete discharge. The second reference voltage, Vref2, is the lowest voltage of the complete discharge. Voltages lower than the second reference voltage, Vref2 are voltages due to excessive discharge.

Rechargeable battery 118 is charged with the voltage at output node N2, and is automatically and forcibly discharged when complete discharge induction circuit 220 is turned on.

Charge display 120 may be constructed with resistor 2 and light emitting diode LED 4 serially coupled between node N1 and the collector electrode of NPN transistor 6. The principal semiconducting path between the collector and emitter electrodes of transistor 6 is coupled to the local circuit ground potential. The base electrode of transistor 6 is coupled to node N3. When rechargeable battery 118 is not completely discharged, NPN transistor 6 is turned on to provide an electrical current path between node N1 and ground potential via LED 4; consequently, LED 4 emits light whenever battery 118 is not completely discharged. Concerning the configuration of FIG. 2, the operations of the preferred embodiment are described below in detail. The situation where the voltage level of the rechargeable battery is higher than complete discharge voltage, is described first. Whenever the battery is charged to a voltage of over fifty percent (50%), forcible discharge is not necessary, and a charge mode of operation is initiated. Since the voltage of output node N2 is higher than the second reference voltage, Vref2 second comparator 26 generates the "HIGH" voltage. The "HIGH" voltage of second comparator 26 does not influence the operation of first comparator 24, and first comparator 24 generates the "HIGH" voltage at its output port. As a result PNP transistor 30 is turned off, NPN transistor 32 is turned on, and NPN transistor 34 is turned on by the "HIGH" voltage on lead 36. The current output by constant current power supply 114 is then applied to output node N2 through the collector-emitter semiconducting channel of NPN transistor 32 while transistor 32 is turned on. Therefore, the electrical current through output node N2 is applied to the positive terminal of rechargeable battery 118.

Second, in another case, when the voltage of the rechargeable battery is lower than the first reference voltage, Vref1, is described as follows. In this case, the battery must be forcibly discharged to decrease the influence of the memory effect by completely discharging battery 118. First comparator 24 produces a "LOW" voltage corresponding to the voltage of output node N2, which is lower than the first reference voltage, Vref1. Second comparator 26 produces a "HIGH" voltage corresponding to the voltage of the output node N2, which is higher than the second reference voltage, Vref2. Then PNP transistor 30 is turned on, NPN transistor 32 is turned off, and NPN transistor 34 is turned off, corresponding to the "LOW" voltage on lead 36. The current of the output node N2 is grounded through PNP transistor 30 when it is turned on. Therefore, rechargeable battery 118 is discharged to the circuit ground potential via resistor 28 until the amplitude of the voltage at output node N2 reaches (i.e., in one particular design, when the amplitude of the voltage at output node N2 is less than or equal to second reference voltage Vref2 and in another design, when second reference voltage Vref2 is equal to or greater than the amplitude of the voltage at output node N2) the amplitude of second reference voltage, Vref2. When the voltage at output node N2 falls to a level lower than second reference voltage, Vref2 second comparator 26 produces a "LOW" voltage at its output port. The negative terminal of first comparator 24 drops to the "LOW" voltage, corresponding to the "LOW" voltage of second comparator 26, and so first comparator 24 converts the "LOW" voltage into the "HIGH" voltage at its output port. PNP transistor 30 is turned off by application of the "HIGH" voltage on lead 36, thereby interrupting discharge of battery 118 via resistor 28, while NPN transistors 32 and 34 are turned on. While transistor 32 remains turned on, current from constant current power supply 114 is applied via output node N2 to rechargeable battery 118.

The negative terminal of first comparator 24 is grounded when NPN transistor 34 is turned on, thereby causing the "HIGH" voltage at the output port of comparator 24. The "HIGH" voltage is applied to the base terminal of transistor 30, connected to lead 36. Therefore, even though the voltage of rechargeable battery 118 is between the first reference voltage Vref1 and the second reference voltage, Vref2 rechargeable battery 118 continues to be charged with current flowing through output node N2.

As described above, the battery charger of the present invention automatically discharges a battery and automatically converts its operational mode from a discharge mode into a charge mode without over-discharging the battery, thereby preventing damage to the battery due to the memory effect and over-discharging, thus improving battery life.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What claimed is:

1. A battery charger for preventing deterioration from memory effect, comprising:

first and second terminals positioned to respectively receive the positive and negative terminals of a rechargeable battery; and a switching circuit responsive to first and second reference voltages, said second reference voltage being lower than said first reference voltage, coupled to automatically discharge the battery when a battery voltage displayed by the battery across said first and second terminals is between the first and second reference voltages, and to automatically charge the battery after the battery voltage reaches said second reference voltage, said switching circuit further comprising:

a first switch disposed between the positive terminal of the battery and a reference potential, said first switch acting in response to the battery voltage and without user intervention to electrically connect the positive terminal of the battery to the reference potential to discharge the battery when the battery voltage is between the first and second reference voltages; and a second switch disposed between a voltage source of said battery charger and the positive terminal of the battery said second switch acting in response to the battery voltage and without user intervention to electrically connect the voltage source to the positive terminal of the battery to charge the battery after the battery voltage reaches said second reference voltage.

2. The charger of claim 1, wherein the first reference voltage is the highest level of a complete discharge, and the second reference voltage is the lowest level of the complete discharge.

3. The battery charger of claim 1, wherein said first switch corresponds to a first transistor and said second switch corresponds to a second transistor.

4. The battery charger of claim 1, wherein said second switch prevents an overdischarging of said battery.

5. A battery charger that converts alternating current into direct current and prevents deterioration from the memory effect, comprising:

a first terminal forming an output node connectable to a first pole of a battery to be charged by said charger with the direct current;

an over-discharge protector operational responsive to first and second reference voltages, said second reference voltage being lower than said first reference voltage, for generating a discharge switching signal when an output voltage occurring at said output node is between said first and second reference voltages in magnitude, and for generating a charge switching signal when said output voltage occurring at said output node reaches said second reference voltage in magnitude;

a first switching circuit, operationally connected to respond to said discharge switching signal and to said charge switching signal, for accommodating flow of electrical current to charge the battery via said output node in response to said charge switching signal and for interrupting said flow of electrical current in response to said discharge switching signal; and a discharge circuit connected between said over-discharge protector and said output node, comprising a second switching circuit responding to said discharge switching signal by forming an electrical connection between said output node and a circuit ground potential for discharging the battery through the output node, and responding to said charge switching signal by opening said electrical connection.

6. The charger according to claim 5, wherein the over-discharge protector comprises:

a third switching circuit closed in response to generation of said charge switching signal;

a first comparator responding to said first reference voltage, for generating said discharge switching signal when said output voltage is less than said first reference voltage in magnitude, and for generating said charge switching signal after said first reference voltage becomes grounded when the third switching circuit is turned on; and a second comparator responding to said second reference voltage, for generating a second active compare signal when said output voltage is approximately equal to or less than said second reference voltage.

7. The charger of claim 5, further comprising a constant current power supply for converting the direct current into constant current and supplying it to the first switching circuit.

8. The charger of claim 6, further comprising a constant current power supply for converting the direct current into constant current and supplying it to the first switching circuit.

9. The charger of claim 5, further comprising a charge display indicating progression of a charging state of the battery connected to said first node, on a basis of direct current and electrical power of the battery.

10. The charger of claim 6, further comprising a charge display indicating how a charging state is progressing according to the direct current and electrical power of the battery.

11. The charger of claim 5, wherein the first reference voltage is a highest complete discharge level of the battery, and said second reference voltage is the lowest complete discharge level.

12. The charger of claim 6, wherein the first reference voltage a highest complete discharge level of the battery, and said second reference voltage is the lowest complete discharge level.

13. The charger of claim 5, further comprised of said over-charge protector exhibiting said first reference voltage with a magnitude established by a highest voltage of the battery attainable at said output node, and exhibiting said second reference voltage with a lowest voltage attainable by the battery at said output node.

14. An apparatus, comprising:

first and second terminals positioned to respectively receive the positive and negative terminals of a rechargeable battery; and a switching circuit responsive to first and second reference voltages, said second reference voltage being lower in magnitude than said first reference voltage, coupled to automatically discharge the battery when a battery voltage displayed by the battery across said first and second terminals is between the first and second reference voltages in value, and to automatically charge the battery after the battery voltage reaches said second reference voltage, said switching circuit further comprising:

a first switch electrically coupled between the positive terminal of the battery and a reference potential, said first switch automatically responding to the battery voltage independently of human intervention by electrically connecting the positive terminal of the battery to the reference potential when the battery voltage is between the first and second reference voltages; and a second switch electrically coupled between a voltage source of said apparatus and the positive terminal of the battery, said second switch automatically responding to the battery voltage independently of human intervention by electrically connecting the voltage source to the positive terminal of the battery after the battery voltage reaches said second reference voltage.

15. The apparatus of claim 14, wherein said first switch comprises a first transistor and said second switch comprises a second transistor.

16. The apparatus of claim 14, wherein said second switch prevents an overdischarging of said battery.

* * * * *